US006920250B1

(12) United States Patent
Kletter et al.

(10) Patent No.: US 6,920,250 B1
(45) Date of Patent: Jul. 19, 2005

(54) ADDITIVE MODEL FOR EFFICIENT REPRESENTATION OF DIGITAL DOCUMENTS

(75) Inventors: Doron Kletter, San Mateo, CA (US); Donald James Curry, Menlo Park, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/262,362

(22) Filed: Mar. 4, 1999

(51) Int. Cl.$^7$ .................................................. G06K 9/64
(52) U.S. Cl. ...................................... 382/233; 382/166
(58) Field of Search .................................. 382/162–167, 382/232–252, 190–195, 199, 173, 176–177, 180, 291–292, 224–227; 358/456, 450, 462, 464–467, 452–453, 537–538, 2.9, 1.2

(56) References Cited

U.S. PATENT DOCUMENTS

| | | | | |
|---|---|---|---|---|
| 4,558,302 | A | 12/1985 | Welch | 340/347 |
| 5,392,362 | A | 2/1995 | Kimura et al. | 382/9 |
| 5,742,704 | A | 4/1998 | Suzuki et al. | 382/176 |
| 5,778,092 | A * | 7/1998 | Macleod et al. | 382/176 |
| 5,778,095 | A * | 7/1998 | Davies | 382/225 |
| 5,900,953 | A * | 5/1999 | Bottou et al. | 358/540 |
| 6,272,255 | B2 * | 8/2001 | De Queiroz et al. | 382/239 |

FOREIGN PATENT DOCUMENTS

| | | | | |
|---|---|---|---|---|
| JP | 07095417 | | 7/1995 | H04N/1/41 |
| WO | 94/06111 | * | 3/1994 | G09G/1/06 |

OTHER PUBLICATIONS

Digital Compression and Coding of Continuous–Tone Still Images—Extensions, Annex F of ITU–T Recommendation T.84 |ISO/IEC IS 10918–3.
JPEG Home Page, http://www.jpeg.org/public/jpeghomepage.htm.

* cited by examiner

Primary Examiner—Jingge Wu
(74) Attorney, Agent, or Firm—Fliesler Meyer LLP

(57) ABSTRACT

Image representation is performed by dividing a source image into foreground, background and selector planes. The foreground plane is selected to contain mainly line type art or textual type information, the background plane mainly contains image data, and the selector plane identifies whether the image data is maintained in either a specific plane or a combination of planes. A color is selected, by averaging or selecting an appropriate value based on overflow or other criteria, to replace each color in the foreground plane. Error in portions of the foreground plane resulting from replacing foreground colors is fed into corresponding portions of the background plane. Each plane is then compressed using compression schemes appropriate for the type of data maintained in each plane (LZW for the foreground, and JPEG for the background and lossless fax LLITT, for example). Image reconstruction is performed by decompressing each of the foreground and background planes, and selecting pixels from each of the foreground plane and an additive image produced by combining image data from both the foreground, background, and selector planes. The selection is made based on the selector plane (selection mask), which identifies where image data is maintained for the reconstructed image (i.e., the upper plane or a combination of planes).

9 Claims, 14 Drawing Sheets

(11 of 14 Drawing Sheet(s) Filed in Color)

*Additive DIR Imaging Model Reconstruction*

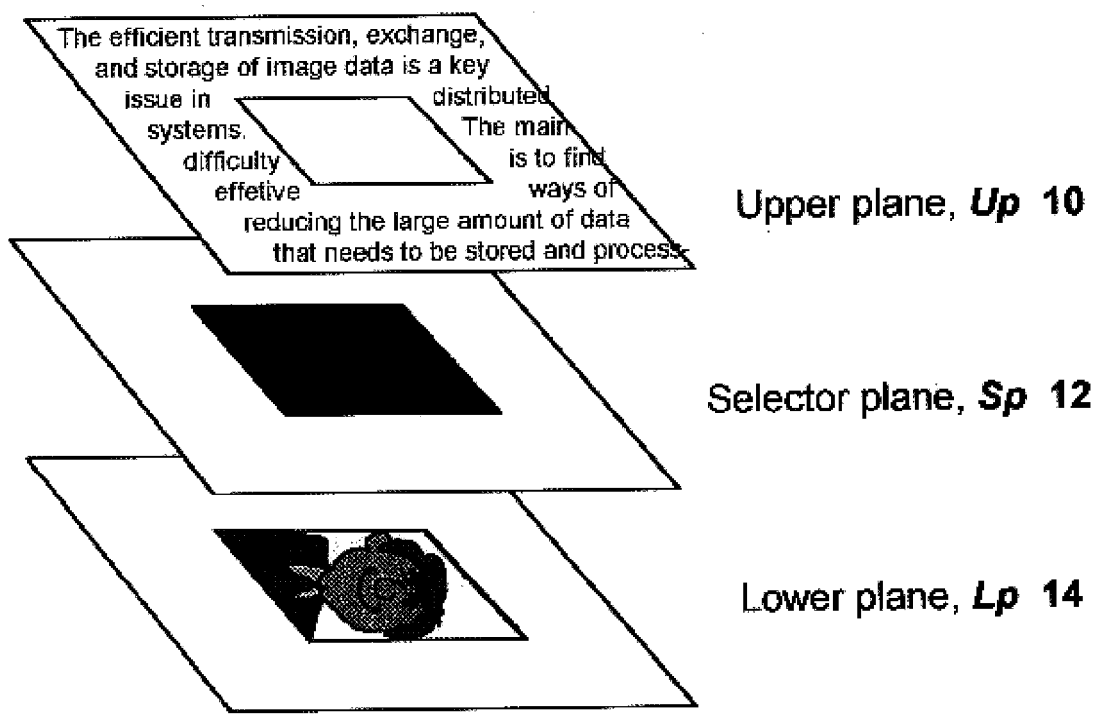
Figure 1: *The Three-Plane Layout of the DIR Model*
Prior Art

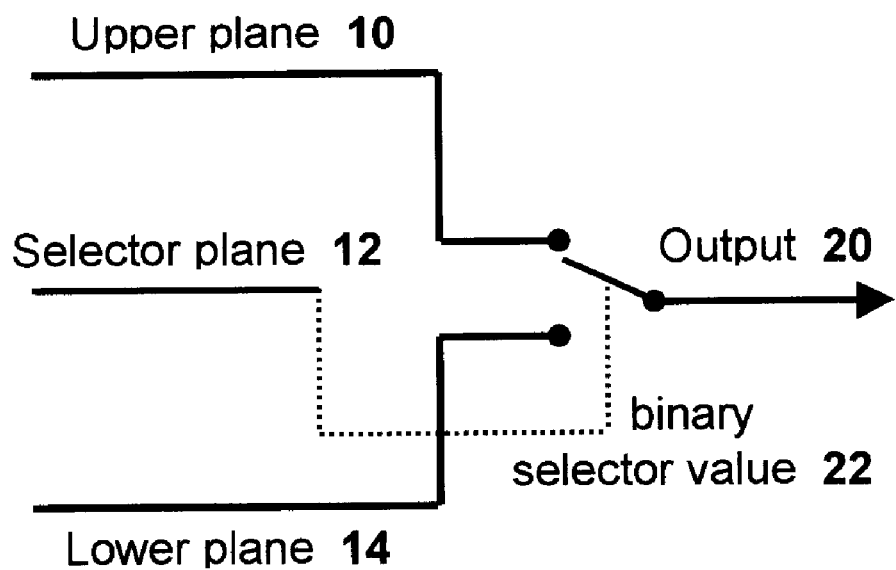
Figure 2: *Selective DIR Imaging Model Reconstruction*
Prior Art

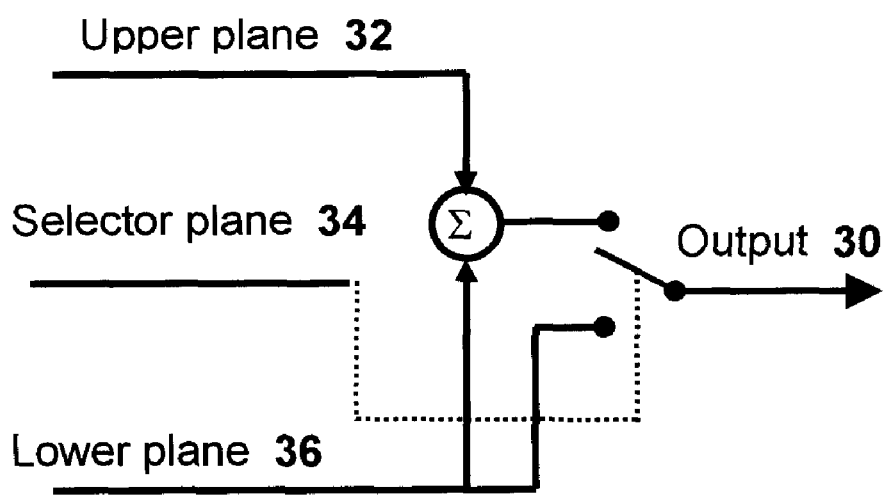
Figure 3A: *Additive DIR Imaging Model Reconstruction*

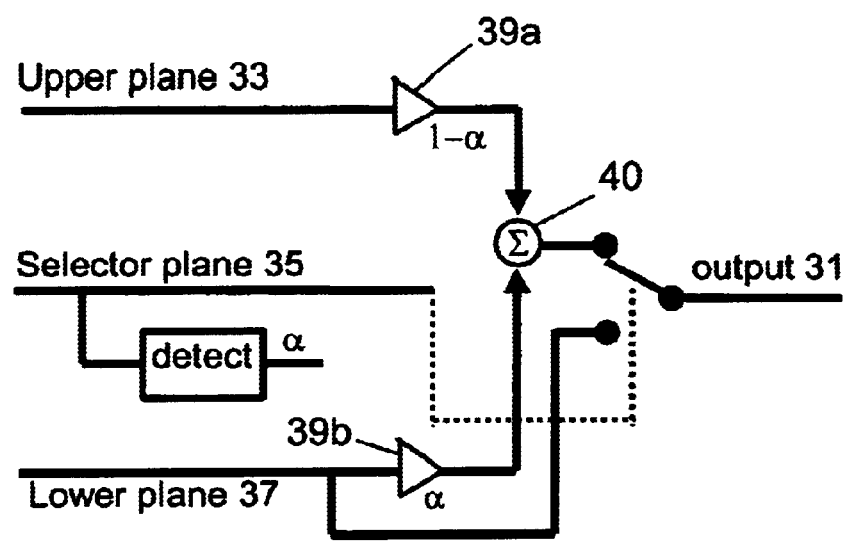
Figure 3B: *Additive DIR Imaging Model Extension*

Source Input Image

Selective Model Upper Plane

Selective Model Selector Plane

Additive Model Upper Plane

Additive Model Selector Plane

Additive Model Lower Plane

ADDITIVE MODEL FOR EFFICIENT REPRESENTATION OF DIGITAL DOCUMENTS

BACKGROUND OF THE INVENTION

1. Field of Invention

This invention relates to the representation of digital images, particularly the representation of those digital images in compressed format. The invention is also related to the representation of digital images in multiple planes of like, similar, or related data traits or values. The invention is more particularly related to the optimization of a plane of a digital image for a selected compression methodology and for storing correction data for the optimized plane in an alternate plane of the image. The invention is also related to the reconstruction of a representation of a digital image by selecting data from either an optimized plane of a representation of the digital image and an additive plane comprising additive data from each of the optimized plane and a correction plane.

2. Discussion of Background

The efficient transmission, exchange, and storage of image data is a key issue in distributed systems. The main difficulty is to find effective ways of significantly reducing the large amount of information that needs to be transferred and/or processed, while still being able to reconstruct the image with good fidelity. The conventional approach to deal with this problem is to reduce the amount of data by applying compression. Several compression technique (such as LZW, JPEG, JBIG, and Wavelets) have been developed over the years to effectively handle the various types of data often found in digital documents. For example, binary compression schemes such as LZW are very effective in dealing with text and line-art information, while JPEG has been successfully developed to encode natural photographs. However, these algorithms have been designed to perform well on a particular class (be it textual or pictorial) of images—and no single algorithm can possibly handle all types of image classes reasonably well.

One approach to achieve high compression ratio is to divide the underlying document by image class, and apply the most appropriate compression technique on each class separately. Text and line-art information would be compressed using an approach that focuses on maintaining the detailed structure (edge information), while pictures and color sweeps would be compressed using an approach that opts for preserving the color depth and smoothness.

The Document Image Representation (DIR) is one way of describing digital documents based on this concept. According to the DIR draft specification (Rev. 1.1 dated Aug. 26, 1996), the current DIR model is represented using three different (logical) planes, as shown in FIG. 1: An upper plane Up, also referred to as the foreground plane, typically containing data that puts high requirements on detail such as text and line-art; A purely binary selector plane Sp, or mask plane, that provides switching information between the upper and lower planes; And a lower plane Lp, also referred to as the background plane, that emphasizes color gradation, such as images and sweeps. Note that the contents of the planes in FIG. 1 is shown just for the purpose of illustration. One could, for example, represent the same image in FIG. 1 (colored text surrounding a picture) by having binary (black) text in the selector plane, and filling the upper plane with the color of the text everywhere. Other variations are also possible.

The embedded imaging model within DIR will be referred to as the Selective Model, since content of the upper plane is used to overwrite the content of the lower plane, on a pixel by pixel basis, whenever the selector plane is true. In other words, the upper plane data is "poured" through the binary selector plane, to replace the lower plane data below. Note that at the end, each reconstructed pixel carries information from either the upper or lower planes. That is, the information present in the other plane (the one not selected by the mask) is considered irrelevant and is ignored.

Adobe Systems, Inc., is currently considering to incorporate a new Masked Image Operator as an extension to Postscript Level III and PDF that could enable DIR reconstruction from a logical multi-planar representation. The new operator can "mask" out the background, leaving a foreground object visible, without having to define a clipping path. The resulting image can then be "placed over" (e.g., overwrite) another background. Hence the Masked Image Operator shares the same property as the embedded imaging model proposed in the DIR specification: they both share the notion of "pouring" the foreground through the mask, and overwriting the data below.

Typically, in each of the DIR and Adobe methods, the upper and lower planes are usually compressed using very different compression schemes. The DIR specification recommends, as an example, use of the following algorithms (DIR spec, pp.8): Fiala-Green (LZW related) for text and line-art (Upper plane), CCITT group 3/4 for the binary mask (Selector plane), and JPEG for color images and sweeps (Lower plane). Hence with the Selective Model, one is forced to pick, per pixel, one compression scheme at all times and is prevented from using a clever combination of both. Even if one could potentially decide on how to separate the information between planes, such decision may inevitably lead to loss of image quality, or alternatively, to comparable reduction in compression. For example, true line-art will not retain a good edge definition when passed through JPEG, unless the compression requirements were greatly relaxed. Similarly, LZW will fail to produce good compression results when applied to noisy photographs.

SUMMARY OF THE INVENTION

The present inventors have realized that a decision to enforce one of the planes at all times limits the flexibility of a representation model.

Accordingly, it is an object of the present invention to provide an image compressor and a method of image compression/representation that varies an amount of detail contained in any of plural image planes representing an image.

It is another object of the present invention to optimize at least one of the plural image planes for compression using a selected compression methodology by varying an amount of image detail maintained in each of the image planes.

It is yet another object of the present invention to determine an amount of image detail in each of the image planes based on at least one of a super-resolution, a fine edge positioning pixels of a selected image plane, and an average color of the selected image plane.

It is still yet another object of the present invention to provide an image decompressor and a method of image decompression that reconstructs an image from plural image planes, including an upper plane and an additive plane that is constructed from image information contained in both the upper plane and an alternate plane the plural image planes.

These and other objects are accomplished by a method of decompressing an image, including the steps of decompressing an upper plane of an image, decompressing a lower plane of an image, adding the decompressed upper plane and the decompressed lower plane to produce an additive image, and selecting pixels of a final decompressed image from one of the decompressed lower plane and the additive image. The step of selecting pixels may include the step of varying an amount of the additive image produced by the upper plane based on a predetermined factor.

In addition, the above objects may be accomplished via a compression apparatus, including means for compressing an upper plane of an image and a lower plane of an image, wherein an amount of detail of the image contained in pixels of the compressed upper plane increases with respect to a predetermined factor of corresponding pixels in the image. In alternate embodiments, the predetermined factor may be one of a degree of color in the corresponding pixels matching a background color of the image and an amount of fine edge positions in the corresponding pixels.

The Document Image Representation (DIR) specification provides a way of describing digital documents by separating textual (line-art) information from continuous-tone pictures and applying different compression on each component, to take advantage of its specific attributes. However, the imbedded imaging model (a Selective Model) as implied by the DIR is limiting: the information must always be classified and strictly carried in one of two channels, but never in both.

The present invention improves and further enhances the existing DIR representation to eliminate the above discussed limitations. Specifically it offers to replace the Selective Imaging Model with an Additive Imaging Model, thereby allowing the flexibility to combine information from both channels to make the best use of available compression resources. In addition, it offers to optionally extend the selector plane beyond binary. These modifications define a new and more flexible method of representing digital documents, that may lead to substantial improvements both in quality and compression results when compared with the existing method. The improvements are demonstrated in a case study example discussed hereinbelow.

BRIEF DESCRIPTION OF THE DRAWINGS

The file of this patent contains at least one drawing executed in color. Copies of this patent with color drawings will be provided by the Patent and Trademark Office upon request and payment of the necessary fee.

A more complete appreciation of the invention and many of the attendant advantages thereof will be readily obtained as the same becomes better understood by reference to the following detailed description when considered in connection with the accompanying drawings, wherein:

FIG. 1 is a diagram illustrating the upper plane, selector plane, and lower plane of a document image representation model;

FIG. 2 is a diagram illustrating the selection process between an upper plane and a lower plane of a selective model reconstruction;

FIG. 3a is a diagram illustrating the selection between an additive plane and a lower plane of the additive model reconstruction according to the present invention;

FIG. 3b a diagram illustrating the selection between an additive plane and a lower plane, each modified according to a detect signal in an alternate embodiment of the additive model reconstruction according to the present invention;

DESCRIPTION OF THE PREFERRED EMBODIMENTS

Figure 4:
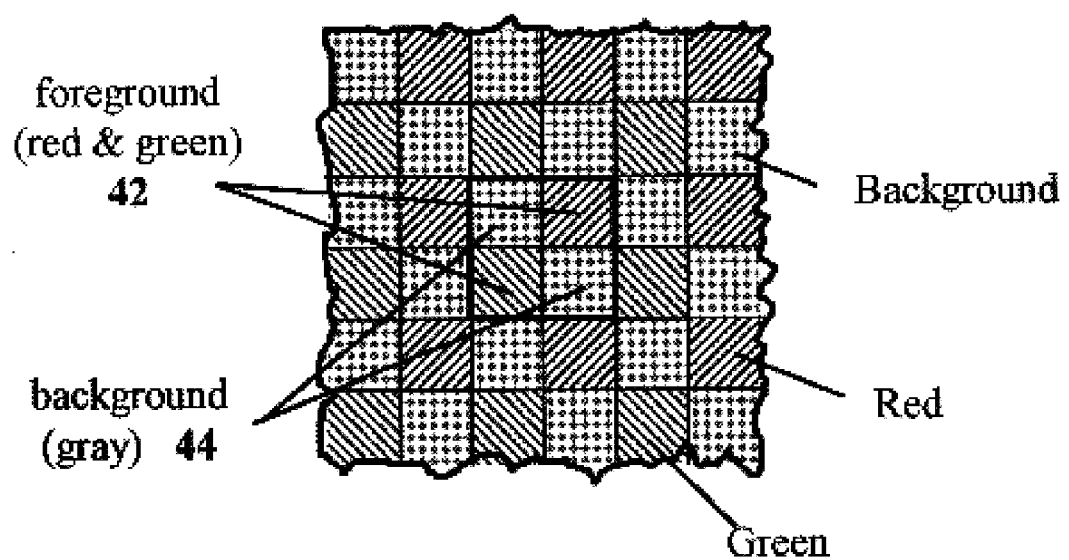
FIG. 4 illustrates a tile pattern utilized in illustrating the processes of additive model reconstruction according to the present invention.

Referring again to the drawings, wherein like reference numerals designate identical or corresponding parts, and more particularly to FIG. 2 thereof, there is illustrated the existing DIR model based on a Selective Imaging Model. In this model, the output image 20 is reconstructed from the DIR representation (the three planes described above, comprising of an upper, lower, and binary selector plane) using a simple multiplex operation. The binary selector value 22, derived from the selector plane, is used to choose data from either the upper plane 10 or lower plane 12, on a pixel by pixel basis. Note that any information that might be present in the other plane (the one not selected by the mask) is ignored and treated as irrelevant.

As already explained, the problem with this model is that a decision must be made for each and every pixel: to select one of the upper or lower planes. The DIR spec does not specify a recommendation as to how to make that decision, so in theory full freedom exists. However, the DIR specification does make a recommendation to use certain standard block based compression techniques for some of the planes (e.g., the use of JPEG for compressing the lower plane). This indirectly implies that the pixels in a block are tied together via the compression, regardless of how they are classified.

A problem occurs whenever not all the pixels within a block are classified to be of the same type. Perhaps the most obvious example that comes to mind is the case where there is some (noisy) text on top of an image. A block of pixels situated on the text boundary will occasionally contain a portion of the text as well as a portion the image. In a perfect world, the text portion could be "lifted" off the image to be encoded in the upper plane, and the remainder is left to be JPEG'ed in the lower plane. However, because pixels within a block are inter-dependent by the compression, the lifted text pieces may end up affecting the quality or compression ratio of the non-textual areas nearby.

Furthermore, the current DIR specification recommends the use of a variant of LZW for compressing the upper plane. This technique favors binary situations with few colors in order to achieve high compression ratios. If several pixels within a block are classified as line-art, and all have different colors (possibly due to noise variations), then the resulting compression performance may drop substantially (as will be demonstrated by the example below).

In this case, one is caught in a fundamental conflict resulting from the inflexibility of the Selective Model: either limit the number of pixels classified as line-art (to keep compression in check), or force them all to have the same color(s). Limiting the number of line-art pixels may result in quality degradation, for the other line-art pixels (the ones not classified as such due to the limit) will be sent through JPEG and may now lose the edge detail. Similarly, if the color(s) are forced, an immediate representation error is made; This error will be carried forward to the output, since a pixel in the upper plane overrides the lower, with no ability to correct for it at a later stage. Hence the existing DIR Model lacks the ability to compensate for desirable adjustments (such as due to compression-related constraints) in the way pixels are classified.

As an alternative, consider the new Additive Imaging Model proposed in this invention as illustrated in FIG. 3a. This model has the advantage in reconstruction, whereby information from an upper plane 32 is first (prior to making the selection) added to the content of a lower plane 36. Note that a significant difference from the previous Selective Model is the introduction of adder 38. The adder 38 combines data from the two channels (Upper plane 32 and lower plane 36), thereby providing a mechanism to correct for representation errors resulting from the classification adjustments discussed above.

The adder may be implemented in alternative ways. For example, the adder may be utilized to combine pixels from the upper and lower planes at the time of selection. Alternatively, the adder may be utilized to combine the upper and lower planes to produce an additive image, and then the selector chooses pixels from either one of the upper plane (in this embodiment) and the additive image. As will be appreciated by one skilled in the art, other configurations to procure the same end result are also possible (selections based on blocks or clusters, as one example).

The Additive Imaging Model can significantly improve the results. For example, given the type of upper plane compression used, the foreground color may be forced to be composed of a limited number of colors (a decision likely to substantially improve the compression), or even to "not-so-close colors", yet compensate for this via the background channel (lower plane in this example). We do so by calculating the individual pixel errors resulting from such a decision, and then subtracting this error from the background value. Furthermore, we can also individually (on a pixel by pixel basis) control how much of the modeling error we wish to carry in each of the channels. This enables compression and quality to be optimized together. It is a huge benefit for the cost of adding a single adder (which may be implemented in either software or hardware).

The Additive Model can also be naturally extended to provide greater resolution for edge detail. Current practice seems to indicate that having a selector plane at higher resolutions is desirable whenever the input resolution is below 600 dpi. For this range, typical Resolution Enhancement techniques (Ret) have been successfully employed to anti-alias (smooth) text and line-art to improve its appearance;

Alternatively, a non-binary selector plane may be utilized. With more than one bit, the selector plane naturally extends to become an alpha channel for mixing (or blending) information between the upper and lower planes. Of course, one would want to limit the number of bits allocated to the selector plane for better compression, but in some situations additional selector plane bits may be advantageous.

The alternative embodiment (extension) is illustrated in FIG. 3b. A detector 38 interprets a value and read from a multi-bit selector plane which is utilized to alter (see amp/mixers 39a and 39b) values read from each of an upper plane 33 and lower plane 37 prior to producing an additive plane (via adder 40).

With this extension, the extra bits in the selector plane are used as weights to vary the mixing proportions of the two channels. One useful application of such non-binary selector could be super-resolution, or fine edge positioning. The closer the edge is, the more weight is given to the foreground as opposed to the background. This technique can eliminate the need for having REt (as a post-processing step) to enhance text and line-art appearance.

To illustrate the advantages of the new approach, consider the example pattern shown in FIG. 4. Suppose the input image is composed of a page that is fully covered with the regular pattern shown (the motivation for choosing this example will become apparent from the description below). The pattern is based on a basic four-quadrant cell whose building element is encapsulated within the center dark frame 40 in FIG. 4. This cell is then regularly tiled over the page to create the complete pattern.

Figure 9:
FIG. 9 illustrates a source image.

This example, as illustrated in FIG. 9, demonstrates that in some cases the new technique can produce significantly better results overall, in terms of the flexibility of the model, the fidelity of representation, and the bottom line compression ratio. True, this example is constructed here merely to make a point, not necessarily to establish a global conclusion. However, as will be demonstrated in this section, the differences can be substantial—enough to justify enabling the new technique.

Assume, without any loss of generality, that the tile size is 8×8 pixels at the given input resolution. This will establish a relationship between the chosen cell size and the standard JPEG block size for the purpose of evaluating compression performance (otherwise the cell size can be considered to be related to the local area of interest with respect to the given viewing conditions and input resolution). It then follows that each quadrant is composed of a total of (4×4)=16 pixels; Two of the quadrants, the red and the green, are collectively referred to as "foreground colors" 42 (unrelated to the plane—names below in any way). Assume further that little noise is present in the foreground (as would be the case whenever images are scanned), and therefore all the pixels in each of the foreground quadrants have very close color values, but not necessarily the same. Similarly, the remaining two quadrants (shown gray) are referred to as "background color" 44 and contain portions of a different contone (continuous tone) image (likely to be noisy too).

The main idea here is to have a relatively "clean" two-color foreground texture on top of some noisy background image, similar to what one would get when scanning colored text or line-art on top of an image. This example is extreme in the sense that every image cell contains a mixture of dual-color foreground and background, a situation not likely to occur very often. In practice, the number of such mixed cells will vary widely, depending on page complexity and segmentation details. Nonetheless, useful insight can be learned from this example.

With a 4×4 pixel size, the quadrants are generally large enough to be quite noticeable (at a typical practical resolution of 300 to 600 dpi). Note that there are three substantially different color areas altogether in FIG. 4 (the example will work as long as the number of distinct foreground colors is greater than one). The pattern of interest was generated using Adobe Photoshop for the purpose of evaluating the compression results. The method of generating the pattern was by filling an 8×8 pixel area with the two solid red/green foreground colors, leaving the two background quadrants as a transparent layer. This area was then tiled to fill an image of the same size as the input image, and independent random Gaussian noise was added everwhere (for all pixels). Finally, the pattern image was applied (using a mask operation) to a given background image (a scanned image of "Lenna", cf. FIG. 9) of equal size such that the background data was propagated through the "holes" in the mask.

FIGS. 5a–5f demonstrate some of the possible ways for representing this tile image according to a DIR representation compatible with the current specification (based on the existing Selective Model). Consider case 5b), for example; Here, the red quadrant information is classified to be in the upper plane, while the three other quadrants are left in the lower plane. The yellow squares indicate areas of irrelevant information in the content of both the upper and lower planes. Since it does not matter what is in there, the best utilization of this space is to fill it in with values that make the corresponding compression as tight as possible (e.g., for case 5b above, one might as well fill the whole upper plane with red everywhere, since this will undoubtedly lead to the highest compression ratio).

Figure 5:
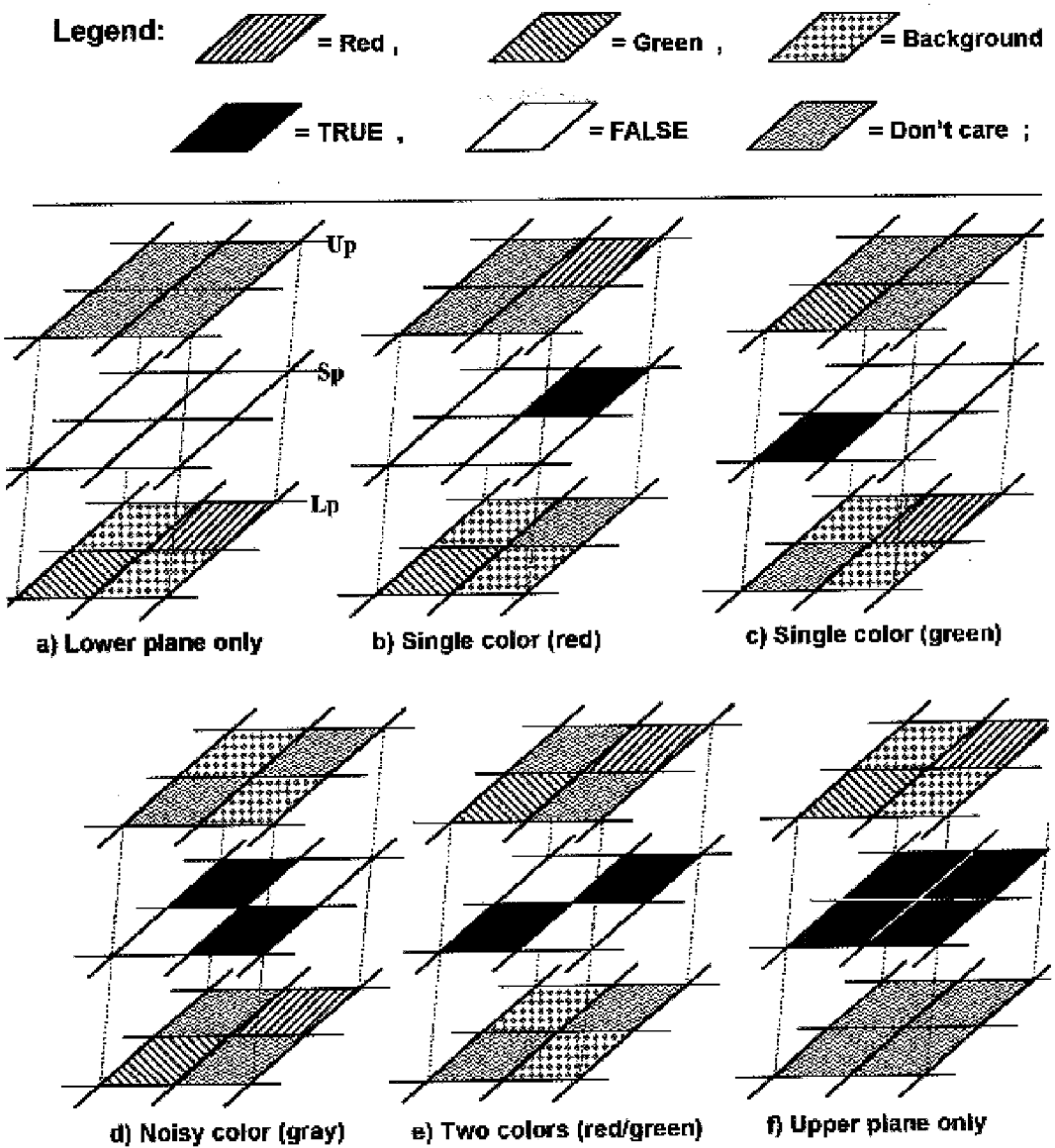
FIG. 5a illustrates the three planes in a selective model reconstruction where all image information is contained in a lower plane only.
FIG. 5b illustrates the three planes of a selective model reconstruction having a single color (red) maintained in an upper plane and all remaining information maintained in the lower plane.
FIG. 5c illustrates the three planes of a selective model reconstruction having a single color (green) maintained in the upper plane and all additional information being maintained in the lower plane.
FIG. 5d illustrates three planes of the selective model when the upper plane maintains a noisy background color and a lower plane maintains foreground color information.
FIG. 5e illustrates the three planes of the selective model representation where the upper plane maintains the foreground colors and the lower plane maintains the noisy background color.
FIG. 5f illustrates the three planes of a selective model representation when the upper plane maintains all information contained in the image.

The examples shown in FIGS. 5a and 5f do not make sense; The selector value is set to either true or false everywhere, forcing the selected (single) plane to carry all the image information; And if the image happens to be complex (as is the case for the tile pattern of interest), one will not be able to effectively compress it, artifact free.

The case illustrated in FIG. 5b is very similar to 5c (a simple color in the upper plane). However, in terms of compression, they may still differ: even though they both share a constant value upper plane (good compression), the lower plane (JPEG) may still compress differently. Obviously, the preferred choice is to pick the one color "red" or "green") that is closest to the "gray" as part of the background. But if both are significantly different from the "gray" such that a strong edge exist on the borders, either case will lead to significant [JPEG] "ringing" artifacts— unless the compression requirements are greatly relaxed. Cases 5b and 5c, however, also share an undesirable quality downside: they both are non-symmetric in the sense that they treat the red and green colors unevenly. The color that is in the upper plane [LZW] will normally maintain uniform density and sharp edges, while the other [JPEG] will vary in density and edges will "ring."

The case illustrated in FIG. 5e may lead to better overall compression than 5a and 5b with respect to both the upper and lower planes combined. None-the-less, it has a more complex selector structure (checkerboard pattern) that might not be as effective to compress (with Lossless fax Group 4 CCITT). If both the red and green are sufficiently dark to be true foreground, the preferred representation might well be the one in case 5e, for the selector plane in this case truly represents the binary mask.

Finally, case 5d is like 5e, except the role of the foreground and background planes are reversed. Again, for a given choice of compression pair (i.e., LZW and JPEG) tied to planes at hand, one of these cases may perform significantly worse. Similar "role-reversal" situations also exist for cases 5b and 5c, but are not shown.

The main purpose of this discussion regarding FIGS. 5a–5f is to demonstrate that the tile pattern in FIG. 4 is complex enough such that one cannot find a simple "artifact free" representation using the Selective Model (without giving up compression). No matter how the data is split, you always have at least one of the upper or lower planes containing alternating checker pattens that will not compress well (resulting in short run lengths in LZW, or edge ringing in JPEG). In fact, the above will hold true for any tri-tone case where more that one "foreground" color exists.

We will now demonstrate how the new Additive Imaging model hereby proposed can significantly improve the results. Consider the preferred case illustrated in FIG. 5e. Here, the lower plane poses no problem, but the upper plane is checkered with at least two colors (red/green). To make it compress better, suppose we attempt to replace the two colors with just a single color. We can pick one of the two, or we can use their average. This will certainly improve the compression of the upper plane, but will also introduce a substantial representation error (a single color instead of the patterned two). With the Selective Model, the error will be carried through, leading to unacceptable results (the only option is to use the lower plane with low compression). With the Additive model, however, this error can be fed back to adjust the lower plane. At reconstruction time, the information from the two planes will be combined (added) together to regenerate the source image.

Figure 6:
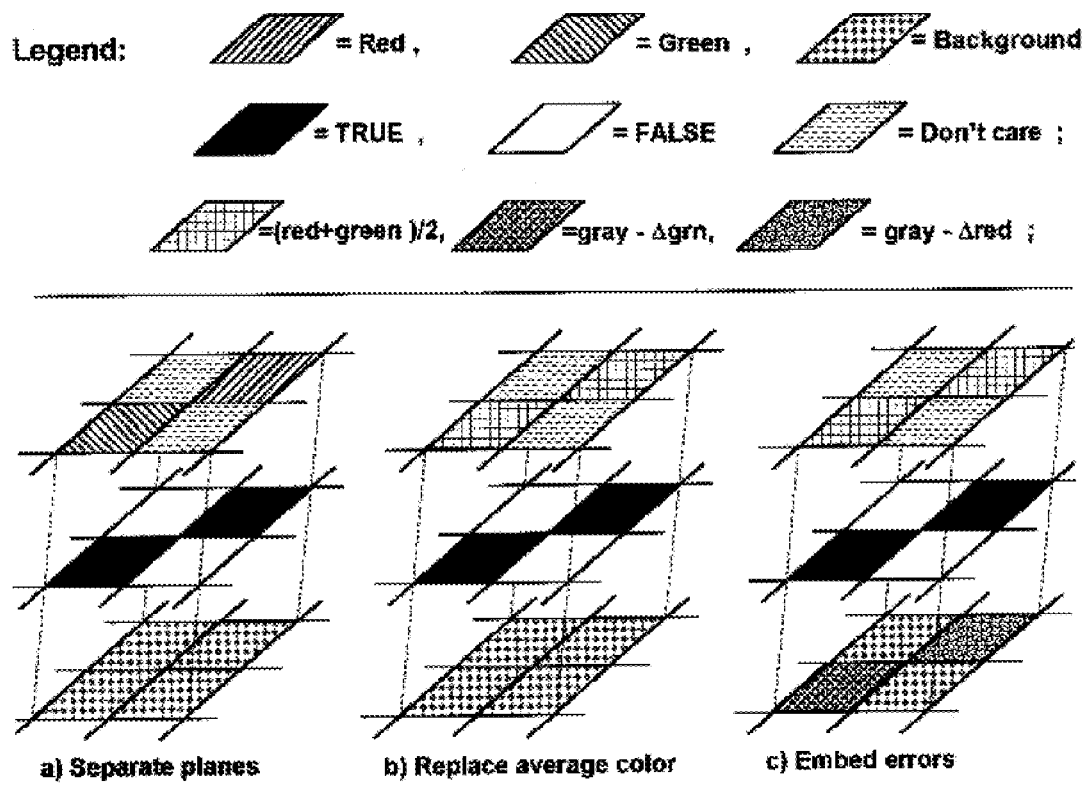
FIG. 6a illustrates the first step of separation of planes according to the additive model of the present invention.
FIG. 6b illustrates the second step of color replacement in an upper plane according to the additive model of the present invention.
FIG. 6c illustrates the final step of embedding errors from upper plane color replacement into a lower plane according to the additive model of the present invention.

To illustrate the technique, consider the three steps shown in FIGS. 6a–6c. In the first step, FIG. 6a the input image is separated into the three planes (conceptually similar to FIG. 5e). One difference being that the lower plane information is always used (due to the additivity) and therefore must be set to some meaningful value (typically the average background color).

Next, in step 2, FIG. 6b, the red and green are replaced by a single color (the average foreground) that best represents both colors (denoted as dark gray color in FIG. 6b and 6c). The difference between this average and each of the two colors is then added to the lower plane in step 3 as seen in FIG. 6c. The color coding scheme illustrated is that the inverse of red is cyan, and the inverse of green is magenta. Note, however, that if both "red" and "green" colors have been identified as foreground, then they are generally of significant contrast and would typically be closer to each other (in luminance) than to the background. The three planes are then compressed as before.

Figure 7:
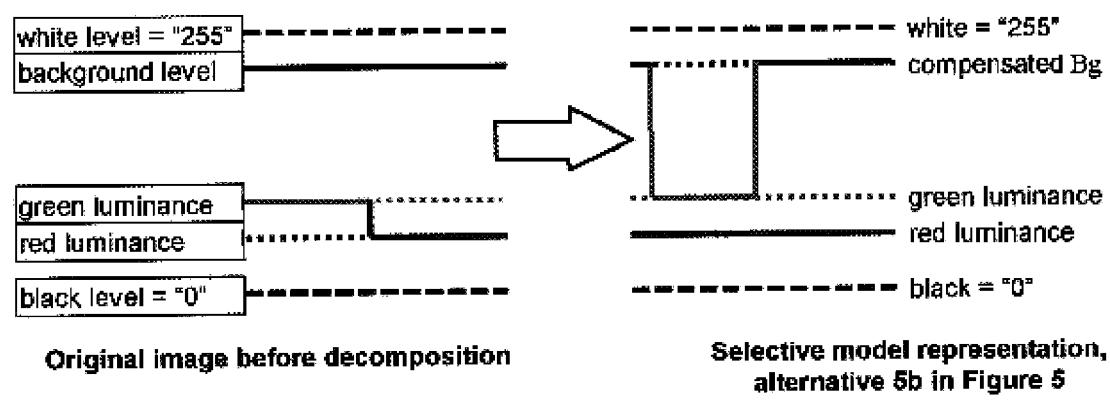
FIG. 7 illustrates a luminance of the selective model representation according to alternative 2b on FIG. 2.

A one-dimensional, luminance only, illustration of the above procedure is illustrated in FIG. 7. Imagine looking at a luminance projection of FIG. 6a. There is a (slowly varying) background level on the lower plane, and alternating red/green checkers on the upper plane. The content of selector plane is not shown. Under the new technique, both the red and green luminance are replaced with the average luminance level, and the background level is compensated by the difference in luminance. Note that before compression, both of these representations are error-free, that is—lossless.

Figure 8:
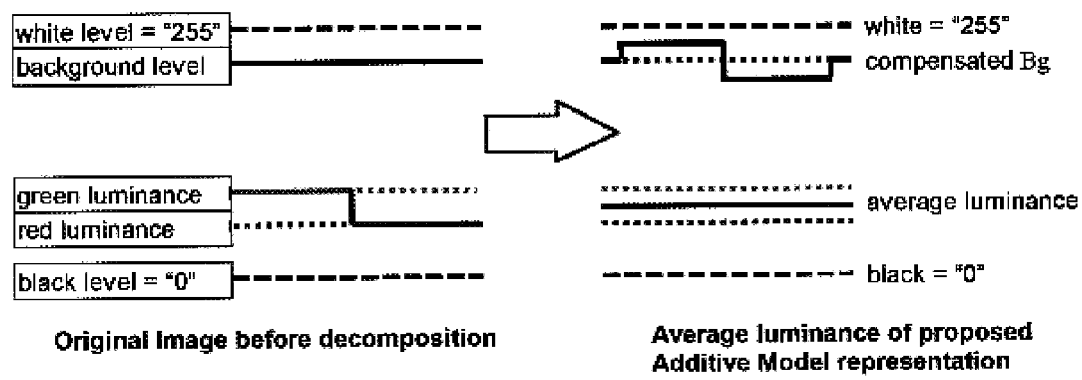
FIG. 8 illustrates an average luminance according to the additive model of the present invention.

The major advantage of the new scheme is now seen from FIG. 8: If the upper plane is paired with LZW compression, for example, then the proposed technique will yield significantly better compression results (as the upper plane becomes constant everywhere). On the other hand, the lower plane that is JPEG compressed will degrade some in quality as a result of compensating the luminance. However, if the two foreground colors are close in luminance, the magnitude variation in luminance in FIG. 8 is much smaller than that in FIG. 7, and therefore lending to much higher quality for a given compression or vice-versa. Observe that the resulting JPEG ringing artifacts will be significantly reduced, as compared with the current approach (the Selective Model). As already explained, the current approach can only obtain similar compression results (i.e., constant upper plane) by picking a single foreground color (preferably the darkest) into the upper plane, and (a-symmetrically) alternating between the other foreground color and background in the lower plane (see FIG. 7). Such schemes unnecessarily lead to larger degradation in image quality (noticeable ringing artifacts) for the same level of compression, or vice versa.

One final comment regarding the choice of foreground color is in order. Some constrains do exist, particularly when the internal bit precision is limited (to 8 bits per component, for example). In our previous example, we have selected to carry the average foreground color in the upper plane. While this particular choice makes a lot of sense visually, it does have a drawback: some of the foreground colors will be lighter, while others will be darker.

As a result, the error will generally be signed. If the error becomes large in magnitude, and the background is already very light, there is risk that the result could overflow (the 8 bit range) when the error is compensated for. In our example, since the error was small by construction (only 5 units in luminance (L*), and the image was never too light to go out of range. One possible solution to this problem (without allocating more bits) is to limit the error magnitude (by reducing the foreground level) such that it will be made to fit. This is another example of the greater flexibility of the proposed approach, where this time some compression is traded for keeping the representation word size fixed.

Simulation Results

The example described in FIG. 4 was simulated using Adobe Photoshop. The pattern was created and combined with the background image "Lenna" as described above. The resulting source image (FIG. 9) was used to generate the following simulation results. A few of the underlying assumptions and comments are:

1. Foreground colors were entered in L*A*B*, where "red"=(40,20,0), "green"=(50,−20,0).

2. The image size is 512×512. Listed file sizes are approximate (e.g., headers, Q-tables, markers, may be included, but the overall effect is very small).
3. The lower plane was compressed using the built-in JPEG, with medium-quality setting (level 3).
4. The standard built-in Photoshop™ JPEG algorithm was used, which to the best of the inventors' knowledge converts color data to YCC first, and then uses a 4:2:2 subsampling scheme.
5. The selector and upper planes were compressed using the standard built-in LZW that comes with TIFF.
6. To make the comparison fair, data that is otherwise ignored was replaced by artificial (averaged) data to yield good compression results (see the specific explanations below).

Figure 10A:
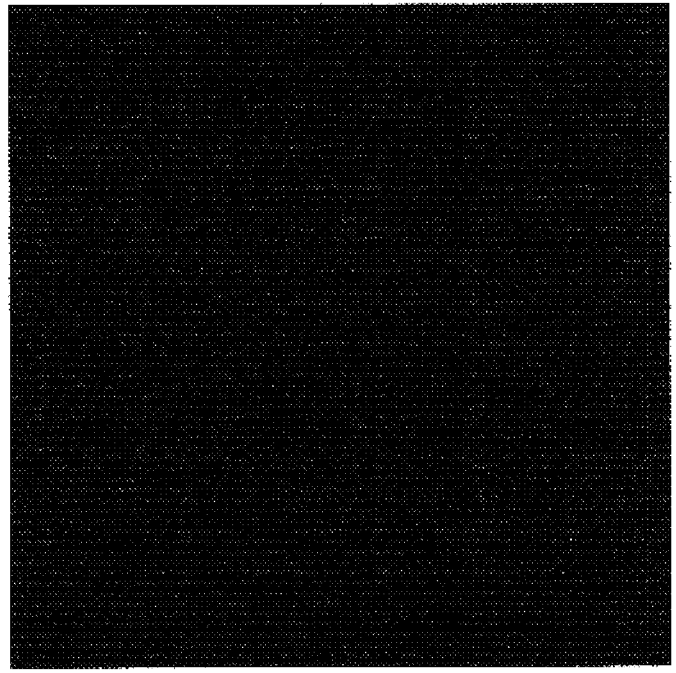
FIG. 10a illustrates a selective model upper plane for the source image of FIG. 9.
Figure 10B:
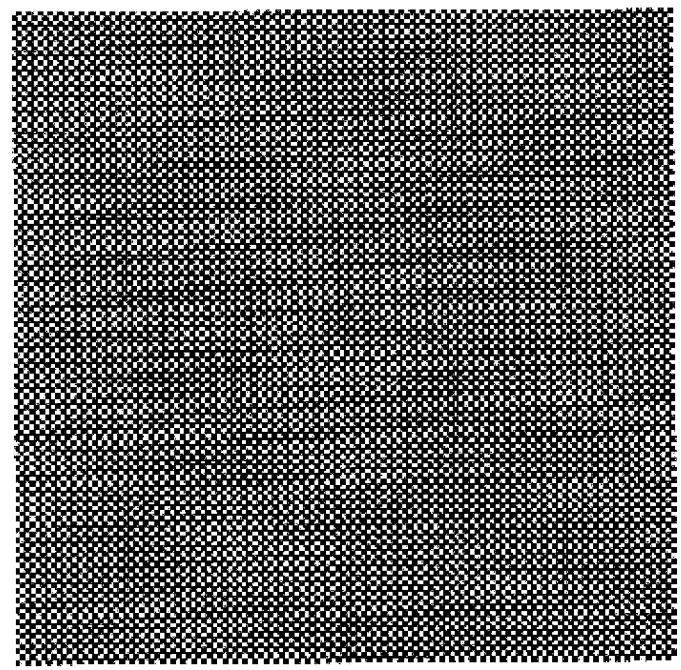
FIG. 10b illustrates a selector plane for the selective model in accordance with the upper plane of FIG. 10a and the source image of FIG. 9.
Figure 10C:
FIG. 10c illustrates a selective model lower plane for the source image of FIG. 9.

FIGS. 10a through 10c show the current DIR representation, following the Selective Imaging Model. FIG. 10a shows the upper plane, composed of alternating (noisy) stripes of red and green. Here, data that exist where the selector plane is false (i.e., where it is ignored) was filled with the average color of the four surrounding 4×4 quadrants directly above, below, and to the left/right of the quadrant to which it belongs.

FIG. 10b depicts the binary mask, where black corresponds to "0", or false. FIG. 10c describes the lower plane. Once again, one reasonable method for filling in the missing data (that has been "lifted" to the upper plane) is to use averaging.

In this case, the original (clean) version of "Lenna" was subsampled by a factor of 8 in each direction, then it was expanded back to the full size (using bi-cubic averaging each time). The low-resolution data so created was then used to replace the red/green checker pattern in the lower plane prior to applying the JPEG compression. Note that this method of replacing data for improving compression is the cause for the noticeable edge artifacts; Whenever the image content is relatively flat, the above averaging operation is indistinguishable from the background. On edges, however, this averaging tend to blend colors together, and therefore becomes more noticeably different.

Figure 11A:
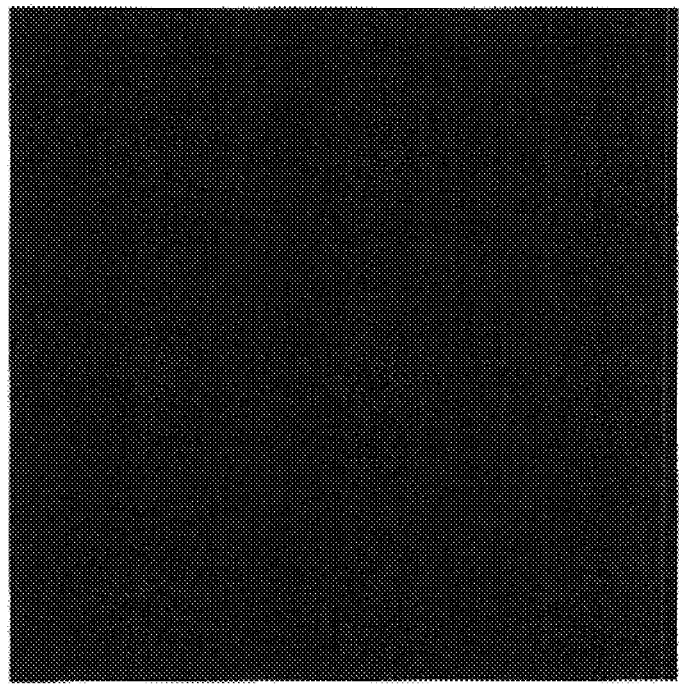
FIG. 11a illustrates an additive model upper plane for the source image of FIG. 9 according to the present invention.
Figure 11B:
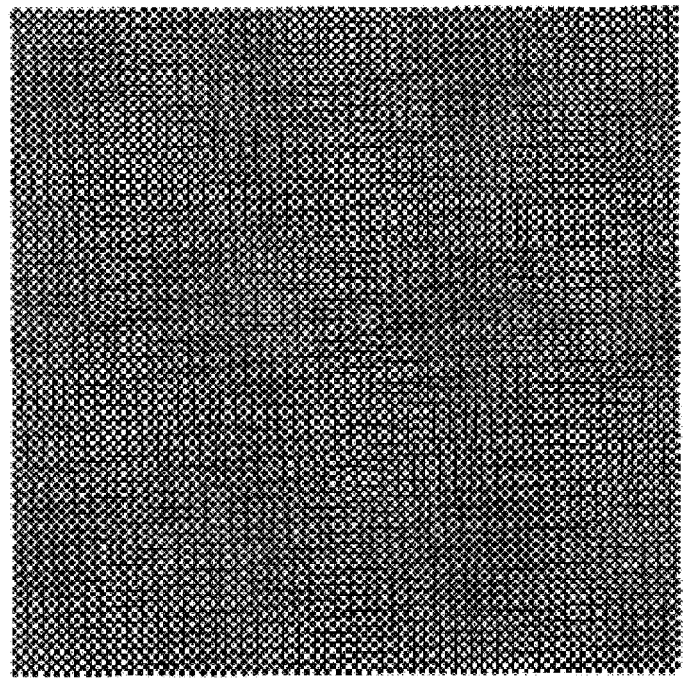
FIG. 11b illustrates a selector plane for the additive model in accordance with the upper plane of FIG. 11a and the source image of FIG. 9 according to the present invention.
Figure 11C:
FIG. 11c illustrates an additive model lower plane for the source image of FIG. 9 according to the present invention.

FIGS. 11a–11c show how the same image would be represented using the proposed Additive Imaging Model. As before, FIG. 9 shows the source image for reference. Note that the selector plane (FIG. 11b) is also identical to the one in FIG. 10b. To demonstrate the huge advantage of the Additive Model, the number of foreground colors has been chosen to be just one color, knowing that this will compress very well in LZW. To select the one color, all the foreground red and green pixels have been averaged together to form the single dark color shown in FIG. 11a. This single color was then used to fill in the complete foreground (Upper) plane.

Note that unlike the Selective Model case, no noise exists in the upper plane as a result of the above decision. Applying this decision, however, has introduced an error to the representation. This error needs to be corrected by adjusting the background (Lower) plane as previously described. For each pixel in the foreground, the error was calculated by taking the (3 dimensional) difference between the actual pixel value and the filled in foreground color, and subtracting it from the background. Note that this adjustment merely represents a transformation to shift the data between the upper and lower planes. This transformation is lossless in the sense that the adjusted planes represent the same source image, with no error, exactly as they did before the adjustment. However, this transformation enables much better compression (as the following simulation results testify).

The added flexibility of the Additive Model allows one to choose how to fine-tune the data between the upper and lower planes as to make the overall compression as tight as possible.

The resulting lower plane is given in FIG. 11c. The outcome can be reasoned as following: The foreground red color happens to be darker than the green (L* value of 40 versus 50). Where the red foreground pixels used to be, the error-adjusted pixels appear to be slightly darker and redder. This is due to the fact that the average foreground color is lighter (L* value of approximately 45), and close to neutral. Therefore the error is making the background redder, and slightly darker. Similarly, where the green pixels used to be, the error-corrected background is made lighter and greener. Since the image has a relatively large red component almost everywhere, this is seen as taking away some red (making it appear to be more greenish-yellow, particularly as seen on the skin tones).

Table 1 summarizes resulting file sizes, quality, and compression ratios obtained. For this example, the proposed Additive technique is clearly far superior (by an order of magnitude) as compared to the existing Selective approach, both in overall compression, as well as in the quality and accuracy of reconstruction.

TABLE 1

| Image/Plane | Existing Selective Model | | | Proposed Additive Model | | |
| --- | --- | --- | --- | --- | --- | --- |
| | file size (bytes) | Compression ratio | reconstruction quality | file size (bytes) | compression ratio | reconstruction quality |
| Source Image | 786,432 | | | 786,432 | | |
| Upper Plane | 412,601 | 1.91 | | 3 + header | 262,144 | |
| Selector plane | 13,875 | 56.68 | | 13,875 | 56.68 | |
| Lower plane | 49,945 | 15.75 | | 53,654 | 14.66 | |
| Total Representation Size | 476,421 | 1.651 | good | 67,564 | 11.64 | excellent |

In addition to an embodiment consiting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMS, microdrive, and magneto-optical disks, ROMs, RAMS, EPROMS, EEPROMS, DRAMs, VRAMs, flash memory devices, magnetic or optical cards, nanosystems (including molecular memory ICs), or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing at least one of additive model representation and reconstruction.

Included in the programming (software) of the general/specialized computer or microprocessor are software modules for implementing the teachings of the present invention, including, but not limited to, separating planes of a source image, averaging at least one of foreground and background colors, replacing colors, and compensating for error introduced by color replacement in one plane by feeding error into a second plane, storage, communication of results, and reconstructing an image according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A method for reconstruction of an image, comprising the steps of:

combining an upper plane and lower plane of image data into an additive plane; and selecting pixels of the image to be reconstructed from plural planes of data representing the image, wherein said step of selecting comprises:

selecting pixels based on a selector plane that identifies, for each part of the original image, whether the original image information is maintained in the upper plane or the additive plane.

2. The method according to claim 1, further comprising the step of:

decompressing said plural planes, including at least an upper plane and a lower plane, from a compressed state.

3. The method according to claim 2, wherein:

said step of combining comprises combining a pixel of the upper plane and lower plane of image data, the additive plane including a single additive pixel.

4. The method according to claim 2, wherein:

said step of decompressing includes the step of, decompressing a selector plane maintaining information identifying which pixels of each other decompressed plane are representative of pixels of the reconstructed image; and said step of selecting comprises, selecting pixels for the reconstructed image based on the selector plane information.

5. An apparatus for reconstructing an image, comprising:

a decompression device configured to decompress planes representing the image;

a combining device configured to combine an upper plane and lower plane of image data into an additive plane; and a selection device configured to select image data from at least one of the planes and the additive plane to reconstruct the image, wherein said selection device is further configured to weight an amount of said result derived from said upper plane based on a predetermined factor wherein said predetermined factor is a value of a selector plane that identifies how much of said result is derived from each of said upper and additive planes.

6. The apparatus according to claim 5, wherein said value of said selector plane is based on at least one of super-resolution and fine edge detail in corresponding locations of said image.

7. A computer readable media, storing instructions, that when loaded into a computer, cause the computer to perform the step of:

combining an upper plane and lower plane of image data into an additive plane; and selecting pixels of the image to be reconstructed from plural planes of data representing the image, wherein said step of selecting comprises:

selecting pixels based on a selector plane that identifies, for each part of the original image, whether the original image information is maintained in an the upper plane or the additive plane.

8. The computer readable media and instructions according to claim 7, wherein said instruction further cause the computer to perform the step of:

decompressing said plural planes, including at least an upper plane and a lower plane, from a compressed state.

9. The computer readable media and instructions according to claim 8, wherein said step of combining comprises:

combining a pixel of the upper plane and lower plane of image data, the additive plane including a single additive pixel.

\* \* \* \* \*